(12) United States Patent
Valjus et al.

(10) Patent No.: US 11,427,440 B2
(45) Date of Patent: Aug. 30, 2022

(54) ELEVATOR ROPE, ELEVATOR ARRANGEMENT AND ELEVATOR

(71) Applicant: Kone Corporation, Helsinki (FI)

(72) Inventors: Petteri Valjus, Helsinki (FI); Juha Helenius, Helsinki (FI); Raimo Pelto-Huikko, Helsinki (FI); Petri Kere, Helsinki (FI)

(73) Assignee: Kone Corporation, Helsinki (FI)

( * ) Notice: Subject to any disclaimer, the term of this patent is extended or adjusted under 35 U.S.C. 154(b) by 979 days.

(21) Appl. No.: 16/172,011

(22) Filed: Oct. 26, 2018

(65) Prior Publication Data

US 2019/0062118 A1 Feb. 28, 2019

Related U.S. Application Data

(63) Continuation of application No. PCT/EP2017/063672, filed on Jun. 6, 2017.

(30) Foreign Application Priority Data

Jun. 7, 2016 (EP) ..................................... 16173342

(51) Int. Cl.
*B66B 7/06* (2006.01)
*B66B 15/04* (2006.01)
(Continued)

(52) U.S. Cl.
CPC .............. *B66B 7/062* (2013.01); *B66B 15/04* (2013.01); *F16G 1/10* (2013.01); *F16G 1/16* (2013.01); *F16G 1/28* (2013.01)

(58) Field of Classification Search
CPC ................................ B66B 7/062; B66B 15/04
See application file for complete search history.

(56) References Cited

FOREIGN PATENT DOCUMENTS

| CN | 101679003 A | * | 3/2010 | ............. B66B 7/062 |
| WO | WO-2010072690 A1 | * | 7/2010 | ............... D07B 1/02 |

(Continued)

OTHER PUBLICATIONS

Machine Translation of specification of WO 2012022517.*

(Continued)

*Primary Examiner* — Diem M Tran
(74) *Attorney, Agent, or Firm* — Harness, Dickey & Pierce, P.L.C.

(57) ABSTRACT

The invention relates to a belt-shaped rope of an elevator having opposite lateral sides facing in thickness direction of the rope, at least one of the lateral sides being shaped to have elongated ribs that are disposed adjacent each other in width direction of the rope and extend parallel with the longitudinal direction of the rope. Each said rib has a first flank face for contacting a flank face of a rib of a rope wheel, and a second flank face for contacting a flank face of a rib of a rope wheel. Each said first and second flank face is shaped to have an arcuate cross-sectional profile, and said first and second flank face are shaped to arc to such steepness that the angle defined between their tangents is acute, and the surface material of said flank faces has shore A hardness more than 85 and less than 100. The invention also relates to an elevator arrangement as well as to an elevator, implementing the aforementioned belt-shaped rope.

17 Claims, 4 Drawing Sheets

(51) Int. Cl.
  *F16G 1/10*  (2006.01)
  *F16G 1/16*  (2006.01)
  *F16G 1/28*  (2006.01)

(56) References Cited

FOREIGN PATENT DOCUMENTS

| WO | WO-2011128223 A2 * | 10/2011 | ............ B66B 7/062 |
| WO | WO-2012022517 A1 * | 2/2012 | ............ D07B 5/006 |
| WO | WO-2011128223 A3 | 3/2012 | |
| WO | WO-2014142979 A1 * | 9/2014 | ............ F16H 55/36 |

OTHER PUBLICATIONS

Machine Translation of Claims of WO 2012022517.*
Machine Translation of 2011128223.*
Machine Translation of CN 101679003.*
International Search Report PCT/ISA/210 for International Application No. PCT/EP2017/063672 dated Jun. 6, 2017.
Written Opinion of the International Searching Authority PCT/ISA/237 for International Application No. PCT/EP2017/063672 dated Jun. 6, 2017.

* cited by examiner

ELEVATOR ROPE, ELEVATOR ARRANGEMENT AND ELEVATOR

This application is a continuation of PCT International Application No. PCT/EP2017/063672 which has an International filing date of Jun. 6, 2017, and which claims priority to European Patent Application number 16173342.3 filed Jun. 7, 2016, the entire contents of both of which are incorporated herein by reference.

FIELD OF THE INVENTION

The invention relates to guidance of a belt-shaped rope of an elevator. The elevator is preferably an elevator for vertically transporting passengers and/or goods.

BACKGROUND OF THE INVENTION

In hoisting devices such as elevators, one or more ropes are used as the means by which the load to be hoisted is suspended. Ropes of an elevator are normally either round in cross section or belt-shaped. Each elevator rope typically includes one or more load bearing members that are elongated in the longitudinal direction of the rope, each forming a structure that continues unbroken throughout the length of the rope. Load bearing members are the members of the rope which are able to bear together the load exerted on the rope in its longitudinal direction. The load, such as a weight suspended by the rope, causes tension on the load bearing member, which tension can be transmitted by the load bearing member in question all the way from one end of the rope to the other end of the rope. Ropes may further comprise non-bearing components, such as a coating, which cannot transmit tension in the above described way. The coating can be utilized for protection of the load bearing members and/or facilitating contact with rope wheels and/or for positioning adjacent load bearing members relative to each other, for example. The coating can also be used to create a wearing surface for controlled friction conditions.

In prior art, such belt-shaped ropes exist which are ribbed. These belt-shaped belt ropes can comprise a wide side shaped to have elongated ribs that are disposed adjacently in width direction of the rope and extend parallel with the longitudinal direction of the rope, and elongated grooves extending between neighboring ribs parallel with the longitudinal direction of the rope. The flanks of the ribs have been planar, at a large angle relative to each other and the material has been soft. The aforementioned ribs and grooves of the rope are suitable for interacting with ribs and grooves of rope wheels around which the rope is to pass. The interaction can be intended for producing lateral guidance for the rope and/or for increasing frictional contact area between the rope and the rope wheel.

A drawback of the solutions of prior art has been that the behaviour of the rope is not in all instances stable, and particularly not throughout the rope lifetime. Unstable behaviour has now been noticed in ropes that have been in use for some time, and in challenging roping configurations where the configuration produces twist or sway in the rope sections extending between rope wheels.

BRIEF DESCRIPTION OF THE INVENTION

The object of the invention is to introduce a new rope and an elevator wherein the stability of the rope behavior is improved. An object is to introduce a solution by which one or more of the above defined problems of prior art and/or problems discussed or implied elsewhere in the description can be solved. Embodiments are presented, inter alia, by which guidance of the rope can be realized keeping it firmly on the pulley while allowing existence of fleet angle or rope twist in the rope configuration.

It has been now found out that in the solutions of prior art, the friction coefficient of a new rope differs from the friction coefficient of an old rope, which makes the behaviour of the rope unsteady and at worst unpredictable due to sensitivity to changes of friction coefficient caused by wear in general, as well as by variation of wear, when wear is produced unevenly in different regions of the rope. The inventors have now concluded that the bandwidth of friction is to be maintained more stable throughout the life time of the rope, which can be realized feasibly with the constructions described hereinafter.

It is brought forward a new belt-shaped rope of an elevator having opposite lateral sides facing in thickness direction of the rope, at least one of said lateral sides being shaped to have elongated ribs that are disposed adjacent each other in width direction of the rope and extend parallel with the longitudinal direction of the rope, each said rib having a first flank face for contacting a flank face of a rib of a rope wheel, and a second flank face for contacting a flank face of a rib of a rope wheel. The surface material of said flank faces has shore A hardness more than 85 and less than 100. Each said flank face is shaped to have an arcuate cross-sectional profile (as viewed in longitudinal direction of the rope). Said flank faces are shaped to arc from the direction of the tip of the rib towards the center of the rope steeper to such steepness that the angle defined between their tangents is acute. Each said tangent is drawn at a point of tangency which is a point of the arcuate cross-sectional profile of the flank face where the flank face in question is arcuate, in particular arcs from the direction of the tip of the wedge-shaped rib towards the center of the rope. With this solution one or more of the above mentioned objects can be achieved. Particularly, the bandwidth of friction is thus controlled through purposeful selection of material hardness of surface in combination to the groove topology. Solving of challenges related to twist can also be facilitated with the combination. Preferable further details are introduced in the following, which further details can be combined with the rope individually or in any combination.

In a preferred embodiment, the ribs of the rope and the grooves of the rope wheel are wedge-shaped.

In a preferred embodiment, the point of tangency of each said tangent is within the central third of the height of the rib as measured in thickness direction of the rope. That is, the tangents are drawn at a point of the flank face, which is within the central third of the height of the rib as measured in thickness direction of the rope. The height of the rib as measured in thickness direction of the rope equals the distance between the rib tip and the bottom of the groove adjacent the rib in question. The flank face may or may not steepen even further beyond the aforementioned point of tangency, but this has little effect on the groove factor.

In a preferred embodiment, the point of tangency of each said tangent is on the same plane extending in width direction of the rope.

In a preferred embodiment, the flank faces of the ribs are symmetrical with respect to a plane extending in thickness direction of the rope.

In a preferred embodiment, the arcuate cross-sectional profiles of the flank faces have a shape of an S-curve. Then the flank faces have each a first section turning in one direction and a second section turning in the other direction, the turning direction changing between said sections. Said first section turns towards the tip of the rib and said second section turns towards the bottom of the groove. In the presented case, the first section turning towards the tip of the rib has radius substantially larger than the radius of the second section turning towards the bottom of the groove. This is preferable, as it provides that the grooves can be simply shaped narrow such that they have substantially smaller cross sectional area than the rib. This also facilitates that the groove can be made to have substantially smaller cross sectional area than the rib, which is preferable in general so as to maximize contact area without making the ribs mechanically weak. For this end, it is also preferable that the radius of the groove bottom is substantially smaller than the radius of the rib tip.

In a preferred embodiment, said hardness is 90 shore A or more. This range provides good results with regard to maintainability of the bandwidth of the friction factor stable. More preferably, said hardness is from 91 to 94 shore A, then most preferably 92 shore A. In this range good results with regard to maintainability of the bandwidth of the friction factor stable are achieved with still good capacity to achieve traction.

In a preferred embodiment, said acute angle is less than 80 degrees. More preferably, said acute angle is less than 60 degrees. The benefits of increased groove factor start to appear first with low gradient when making the angle sharper, and increase strongly when said acute angle is in the range below 60 degrees.

In a preferred embodiment, said acute angle is less than 60 degrees, and said hardness is from 91 to 94 shore A, most preferably 92. With this combination, best results with regard to maintainability of the bandwidth of the friction factor stable while maintaining good capacity to achieve traction were obtained.

In a preferred embodiment, said surface material comprises polymer. Preferably more than 80% of said surface material is of polymer (weight proportion). Preferably, said polymer is polyurethane, such as thermoplastic polyurethane. The hardness properties of the surface material can be adjusted to the desired values with additives or particles added to the polymer serving as base material.

In a preferred embodiment, the ribs are ribs suitable for extending into grooves of a rope wheel, wherein the rope wheel is a rope wheel comprising elongated grooves that are disposed adjacent each other in axial direction of the rope wheel and extend along the circumference of the rope wheel parallel with each other. The grooves are grooves suitable for receiving ribs of the rope wheel.

In a preferred embodiment, said at least one of the lateral sides is shaped to have one or more (number depending on how many ribs) elongated grooves, each extending between neighboring ribs parallel with the longitudinal direction of the rope and each said groove is delimited by flank faces of neighboring ribs that have a first flank face for contacting a flank face of a rib of a rope wheel, and a second flank face for contacting a flank face of a rib of a rope wheel, each said flank face being shaped to have an arcuate cross-sectional profile (as viewed in longitudinal direction of the rope), and said flank faces are shaped to arc from the direction of the tip of the rib towards the center of the rope to such steepness that the angle (alfa) defined between their tangents is acute, and the surface material of said flank faces has shore A hardness more than 85 and less than 100.

In a preferred embodiment, each said groove of the rope has substantially smaller cross sectional area than the neighboring ribs of the rope between which it is located.

In a preferred embodiment, said acute angle is more than 30 degrees.

In a preferred embodiment, the ribs and the grooves are continuous.

In a preferred embodiment, the flank faces form the opposite sides of the rib each facing substantially obliquely in width direction of the rope.

In a preferred embodiment, each said flank face of the belt-shaped rope is shaped without planar sections.

In a preferred embodiment, the number of ribs of the at least one of the lateral sides is different, preferably bigger, than the number of load bearing members of the rope.

In a preferred embodiment, the number of ribs of the at least one of the lateral sides is five or more.

In a preferred embodiment, said rope is a suspension rope for suspending an elevator car of an elevator.

In a preferred embodiment, the rope is substantially larger in its width direction than in its thickness direction.

In a preferred embodiment, the width/thickness ratio of the rope is more than two, preferably more than 4.

In a preferred embodiment, the rope comprises a coating made of said surface material. This is preferably implemented such that the rope comprises one or more load bearing members, and a coating forming the surface of the rope, and the one or more load bearing members are embedded in the coating and extend parallel with the longitudinal direction of the rope unbroken throughout the length of the rope embedded in the coating.

In a preferred embodiment, said one or more load bearing members are made of composite material comprising reinforcing fibers embedded in polymer matrix, said reinforcing fibers preferably being carbon fibers or glass fibers.

In a preferred embodiment, module of elasticity E of the polymer matrix is over 2 GPa, more preferably over 2.5 GPa, and less than 10 GPa, most preferably in the range 2.5-4.5 GPa.

In a preferred embodiment, module of elasticity of the surface material is 22 MPa-200 MPa.

In a preferred embodiment, the reinforcing fibers of each load bearing member are substantially evenly distributed in the polymer matrix of the load bearing member in question. Furthermore, preferably, over 50% of the cross-sectional square area of the load bearing member consists of said reinforcing fibers. Thereby, a high tensile stiffness can be facilitated. Preferably, the load bearing members cover together over proportion 50% of the cross-section of the rope.

In a preferred embodiment, the reinforcing fibers of each said load bearing member are parallel with the longitudinal direction of the load bearing member. Thereby the fibers are also parallel with the longitudinal direction of the rope as each load bearing member is oriented parallel with the longitudinal direction of the rope. This facilitates further the longitudinal stiffness of the rope. In this context the disclosed rope terminal arrangement is particularly advantageous, because it does necessitate sharp bending of the rope.

In a preferred embodiment, the rope comprises a plurality of said load bearing members spaced apart in width direction of the rope the coating extending between neighboring load bearing members.

In a preferred embodiment, each of said one or more load bearing members is larger in width direction of the rope than in its thickness direction of the rope. Particularly, the width/thickness ratio of each of said one or more load bearing members is preferably more than 2. Thereby, the bending resistance of the rope is small but the load bearing total cross sectional area is vast with minimal non-bearing areas.

In a preferred embodiment, both of the lateral sides of the rope are shaped to have elongated ribs that are disposed adjacent each other in width direction of the rope and parallel with the longitudinal direction of the rope, each said rib having a first flank face for contacting a flank face of a rib of a rope wheel, and a second flank face for contacting a flank face of a rib of a rope wheel, each said flank face being shaped to have an arcuate cross-sectional profile (as viewed in longitudinal direction of the rope), and said flank faces are shaped to arc from the direction of the tip of the rib to such steepness that the angle (alfa) defined between their tangents is acute, and the surface material of said flank faces has shore A hardness more than 85 and less than 100. The material properties of said surface material are preferably the same for both sides of the rope, the surface material preferably being formed by the same coating.

In a preferred embodiment, the flank faces of the rope and/or the surface of the rope wheel are roughened. The roughening is not necessary, however it is advantageous for controlling the friction properties of the rope wheel contact. The roughening furthermore facilitates that the bandwidth of the friction remains more stable from the beginning to end of the life time without problems. The roughening also facilitates reduction/prevention of stick-slip noise. The surface roughness Ra of the roughened flank faces of the rope and/or the surface of the rope wheel is preferably greater than 3.2 micrometers. For the purpose of roughening the flank faces of the rope, the surface material thereof can comprise particles embedded in polymer material of the surface material. The particle size is preferably 0.1 micrometers –0.1 mm. For the purpose of roughening the flank faces of the rope wheel, the surface material thereof can comprise particles embedded in a base material of the rope wheel, wherein the base material is preferably metal or polymer material. The particle size is preferably 0.1 micrometers –0.1 mm.

It is also brought forward a new elevator arrangement comprising at least one belt-shaped rope of an elevator as defined anywhere above, and at least one rope wheel provided with counterpart shape for the rope, and said at least one belt-shaped rope is arranged to pass around said at least one rope wheel such that a lateral side of the rope shaped to have elongated ribs engages the counterpart shape of the rope wheel. With this solution one or more of the above mentioned objects can be achieved. Preferable further details are introduced in the following, which further details can be combined with the elevator arrangement individually or in any combination.

In a preferred embodiment, the rope wheel comprises elongated grooves that are disposed adjacent each other in axial direction of the rope wheel and extend along the circumference of the rope wheel parallel with each other, and the ribs of the rope extend into grooves of the rope wheel. Preferably, each said groove is delimited by flank faces that are shaped to have an arcuate cross-sectional profile (as viewed in longitudinal direction of the rope), and each of said flank faces is shaped to arc to such steepness that the angle (alfa) defined between the tangents of flank faces of each groove is acute. Accordingly, flank faces of both the rope and the rope wheel reach a high steepness.

In a preferred embodiment, the flank faces of the rope wheel have been shaped similar or at least substantially similar, but negative, in respect to the flank faces of the ribs of the rope. Thereby these fit well each other with large contact area.

In a preferred embodiment, the rope wheel comprises elongated ribs that are disposed adjacent each other in axial direction of the rope wheel and extend along the circumference of the rope wheel parallel with each other.

In a preferred embodiment, said rope is a suspension rope arranged to suspend the elevator car. Preferably, it belongs to a suspension roping comprising one or more suspending ropes for suspending the elevator car.

In a preferred embodiment, said at least one rope wheel includes a drive wheel rotatable by a motor.

In a preferred embodiment, the diameter of each said rope wheel is preferably more than 250 mm. This is measured from the bottommost point of the groove. This is advantageous for the behavior of the rope in bending. Particularly, hereby formation of fractures or cracks in the hard surface material and/or the load bearing members can be reduced.

In a preferred embodiment, the tips of the ribs of the rope wheel are shaped such that an air gap is formed between the tips and the bottom of the groove of the belt-shaped rope when the belt-shaped rope and the rope wheel are engaged. This can be implemented such that the tips of the ribs of the rope wheel have a larger rounding radius than the bottoms of the grooves of the rope, or alternatively the tips of the ribs of the rope wheel can be shaped flat. Preferably, the height of the air gap is at least 0.2 mm or more, as measured in thickness direction of the belt-shaped rope.

In a preferred embodiment, said at least one rope wheel comprises two rope wheels, which are each provided with a counterpart shape for the rope, and said at least one belt-shaped rope is arranged to pass around each of said two rope wheels such that a lateral side of the rope (the same lateral side or different lateral sides) shaped to have elongated ribs engages a counterpart shape of the rope wheel in question. The combination of hard surface material, and acute flank angle alleviate challenges present particularly in this context, such as maintainability of bandwidth of the friction as well as problems caused by twist or fleet angle existing in the system either intentionally or unintentionally. Preferably, one of the two rope wheels is a rope wheel mounted on a stationary structure, and the other is a rope wheel mounted on the car. In this kind of context the advantages in avoiding problems of twist or fleet angle are particularly relevant. Said one of the two rope wheels is preferably a drive wheel.

In a preferred embodiment, the aforementioned two rope wheels have mutually nonparallel horizontal rotational axes. Ability to guide the ropes without problems with a large angle between the rotational axes, gives freedom to layout design. The two rope wheels can have mutually nonparallel horizontal rotational axes such that there is rope twist and/or fleet angle in the rope configuration. When twist is present, the two rope wheels are arranged such that the rope passing between said two rope wheels has twist around its longitudinal axis. The mutually nonparallel rotational axes can then be at an angle 30-90 degrees, whereby the elevator is designed to have intentionally considerable twist in the belt-shaped rope and the elsewhere specified rib design becomes particularly critical for eliminating problems. When fleet angle is present, the two rope wheels are arranged such that the rope arrives from one of the rope wheels to the other of the rope wheels from a direction that is not completely orthogonal to the axis of the rope wheel.

In a preferred embodiment, both of the lateral sides of the rope are shaped to have elongated ribs as mentioned earlier above, and said at least one rope wheel comprises two rope wheels, which are provided with counterpart shape for the rope, and said at least one belt-shaped rope is arranged to pass around said two rope wheels such that one of its lateral sides shaped to have elongated ribs engages the counterpart shape of one of the rope wheels, and the other of its lateral sides shaped to have elongated ribs engages the counterpart shape of the other of the rope wheels.

It is also brought forward a new elevator comprising an elevator arrangement as described anywhere above, and an elevator car, and said at least one rope is connected with the elevator car.

The elevator is preferably such that the car thereof is configured to serve two or more vertically displaced landings. The elevator is preferably configured to control movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
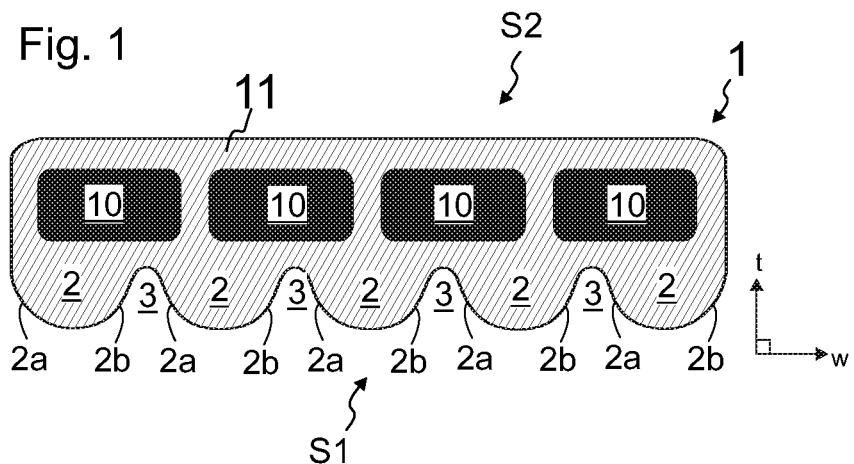
FIG. 1 illustrates a cross-sectional view of a first embodiment of a rope.
Figure 2:
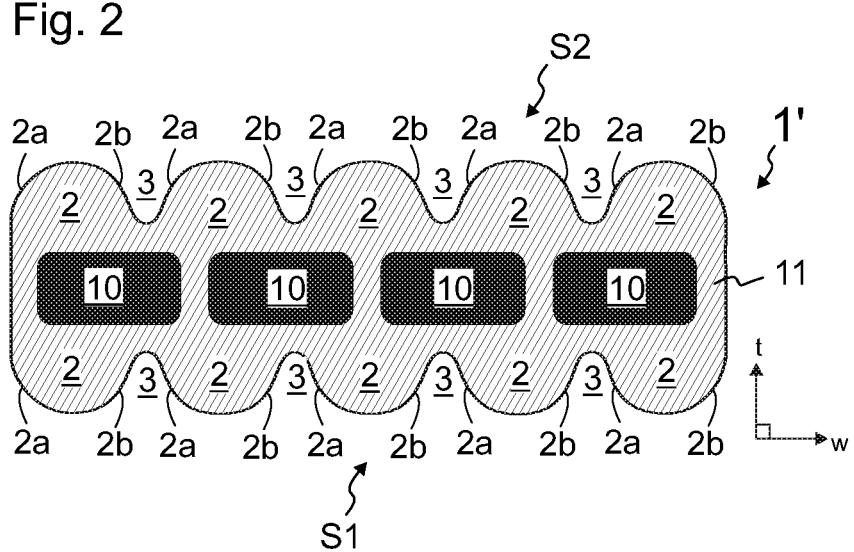
FIG. 2 illustrates a cross-sectional view of a second embodiment of a rope.

FIGS. 1 and 2 each illustrate a preferred embodiment of a belt-shaped rope 1,1' of an elevator having two opposite wide lateral sides S1, S2, i.e. lateral sides that extend in width direction of the rope 1,1' and face in thickness direction t of the rope 1,1'.

In the embodiment of FIG. 1, one of the lateral sides S1, S2, is shaped to have elongated wedge-shaped ribs 2 that are disposed adjacent each other in width direction w of the rope 1 and extend parallel with the longitudinal direction 1 of the rope 1. This embodiment suits well to be used in elevator arrangements where ribs are needed on one side of the rope 1. This is the case for instance in elevators where only one side of the rope 1 comes in contact with the rope wheels of the elevator when running along its route. In the embodiment of FIG. 2, each of the two lateral sides S1, S2 is shaped to have elongated wedge-shaped ribs 2 that are disposed adjacent each other in width direction w of the rope 1' and extend parallel with the longitudinal direction 1 of the rope 1'. This embodiment suits well to be used in elevator arrangements where ribs are needed on two opposite sides of the rope 1'. This is the case for instance in elevators where two opposite sides of the rope 1' come in contact with the rope wheels of the elevator when running along its route.

In the embodiments of FIGS. 1 and 2, each said side S1;S1,S2 that is shaped to have elongated wedge-shaped ribs 2 is also shaped to have one or more elongated wedge-shaped grooves 3, each extending between neighboring ribs 2 parallel with the longitudinal direction 1 of the rope 1,1' and each said groove 3 is delimited by flank faces 2a, 2b of neighboring ribs 2. The number of the grooves depends on how many ribs 2 the rope is designed to comprise.

Each said wedge-shaped rib 2 has a first flank face 2a for contacting a flank face 6a,6b of a wedge-shaped rib 6 of a rope wheel 4,40,41, and a second flank face 2b for contacting a flank face 6a,6b of a wedge-shaped rib 6 of a rope wheel 4,40,41. The surface material of the rope 1,1' forming said flank faces 2a, 2b has shore A hardness more than 85, more preferably hardness 90 or more, however less than 100. The first flank face 2a and a second flank face 2b are shaped to have an arcuate cross-sectional profile (as viewed in longitudinal direction of the rope), and said flank faces 2a, 2b are shaped to arc from the direction of the tip of the wedge-shaped rib 2 towards the center of the rope 1,1' to such steepness that the angle alfa defined between their tangents Ta, Tb is acute. Each said tangent is drawn at a point of tangency p which is a point of the arcuate cross-sectional profile of the flank face where the flank face 2a, 2b in question is arcuate, in particular arcs from the direction of the tip of the wedge-shaped rib 2 towards the center of the rope 1,1'. The material being relatively hard and the angle alfa of the flank faces being sharp provides that the bandwidth of the friction can be maintained stable throughout the life time of the rope yet maintaining good capacity to achieve traction. It has been noticed that with the hard material, variation of the traction conditions between the rope 1,1' and a rope wheel can maintained low. Due to relatively hard material, the friction coefficient of the surface becomes moderate or at least relatively low, which on the other hand is eliminated by the acute angle design for increasing the groove factor. Groove factor indicates the ability of a groove of a rib of a rope wheel to produce normal force and surface pressure on the flank face of the rib of a rope. The tangent is directly dependent on steepness of the flank face. An arcuate flank face with steep tangent provides a capacity of high groove factor when placed to pass around a rope wheel provided with a counterpart shape. The combination of hard surface material, and acute angle alfa furthermore facilitate stability of the rope system by reducing random occurrence of climbing of the rope 1,1' along either of the flank faces of the groove of the rope wheel wherein the rope is fitted during use, which makes the rope 1,1' more stable as the system becomes more tolerant of twist or fleet angle, regardless of whether it is unintended or designed in the system on purpose. The solution thus suits very well for an elevator where twist and/or fleet angle is/are likely to occur. Shaping the flank face 2a,2b for contacting a flank face of a rib of a rope wheel arcuate provides that a steep angle between contacting faces of the rope and rope wheel is simply established. The rope 1,1' thus shaped arrives at, and passes along the rope wheels diverting its course without making much noise and without experiencing excessively engagement related problems, such as stick slip problems. The arcuate shape gives the flank face 2a,2b a smooth outline and allows proper and gentle engagement even if there are slight differences between the positions and/or shapes of the rope 1,1' and the counterpart rope wheel, as under compression the arcuate flanks of the rib can slightly reshape and adapt such that the rib settles and fits properly in the groove of the rope wheel without damaging. The flank shape being arcuate also simply facilitates making the rope rib topology low. It is also simple to manufacture with robust manufacturing techniques.

The flank faces 2a, 2b form the opposite side faces of the rib 2, each facing substantially obliquely in width direction w of the rope 1,1'. The ribs 2 and grooves 3 of the rope 1,1' are suitable for interacting with ribs and grooves of rope wheels around which the rope 1,1' is arranged to pass. The interaction is intended for producing lateral guidance for the rope 1,1' and/or for increasing frictional contact area between the rope 1,1' and a rope wheel. Therefore, the ribs 2 of the rope 1,1' are ribs suitable for extending into grooves of a rope wheel, wherein the rope wheel is a rope wheel provided with counterpart shape for the rope 1,1' and comprising elongated wedge-shaped grooves that are disposed adjacent each other in axial direction x of the rope wheel and extend along the circumference of the rope wheel parallel with each other. The grooves 3 of the rope 1,1', on the other hand, are grooves suitable for receiving ribs of said rope wheel.

Said surface material preferably comprises polymer. Preferably more than 80% of it is of polymer (weight proportion). Preferably, said polymer is polyurethane, such as thermoplastic polyurethane. Alternatively, said polymer can be rubber or silicone. Also other alternative elastomer materials can be used.

Figure 3:
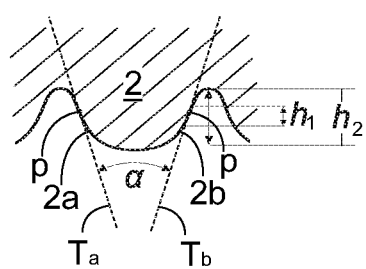
FIG. 3 illustrates an enlarged view of a rib of FIGS. 1 and 2.

In the following, preferred further details of the rope 1,1' are described. In the preferred embodiment, the point of tangency p of each said tangent Ta, Tb is within the central third h1 of the height h2 of the rib 2 as measured in thickness direction t of the rope Lr. That is, the tangents Ta, Tb are drawn at a point of the flank face 2a,2b, which is within the central third h1 of the height h2 of the rib 2 as measured in thickness direction t of the rope 1,1'. This is illustrated in FIG. 3. The height of the rib as measured in thickness direction t of the rope 1,1' equals the distance between the rib tip and an adjacent groove bottom. In the preferred embodiment, the point of tangency p of each said tangent Ta, Tb is on the same plane extending in width direction of the rope, which is preferable in order to obtain symmetry and thereby ability to avoid distortion when being subjected to compression when tensioned around a rope wheel. It is also preferable, that the rope 1,1' is shaped such that the arcuate cross-sectional profiles of the flank faces 2a, 2b have a shape of an S-curve. The shape of an S-curve provides smooth outline wherein amount of point loading is not excessive. Thus, the rope 1,1' does not have spots where splitting or cracking of the rope 1,1' can become excessive. Deformation at the arcuate spots is evened out within a bigger material amount and sensitivity to splitting or cracking is decreased, which is advantageous particularly due to the hardness being relatively high, and the ability of the material to yield and even out internal tension thereby being more limited.

In FIGS. 1, 2 and 3 each illustrating a cross sections of a rope 1,1', the above mentioned features are visible as the outlines of the flank faces 2a,2b have a first section turning in one direction and a second section turning in the other direction, the turning direction changing between said sections. Said first section turns towards the tip of the rib and said second section turns towards the bottom of the groove. In the presented case, the first section turning towards the tip of the rib has radius substantially larger than the radius of the second section turning towards the bottom of the groove. This is preferable, as it provides that the grooves 3 can be simply shaped narrow such that they have substantially smaller cross sectional area than the rib 2. This also facilitates that the groove 3 can be made to have substantially smaller cross sectional area than the rib 2, which is preferable in general so as to maximize contact area without making the ribs 2 mechanically weak. For this end, it is also preferable that the radius of the groove bottom is substantially smaller than the radius of the rib tip.

The cross section of the rope 1,1' continues the same in its longitudinal direction 1 at least to the amount that the outlines of the flank faces 2a,2b continues the same in longitudinal direction 1 of the rope 1,1'.

As mentioned, said shore A hardness values are high at least to the extent that the hardness is more than 85. The advantageous effect on maintainability of the bandwidth of the friction factor stable throughout the life time of the rope starts to appear when the hardness is more than 85. The effect becomes gradually more substantial, and when said hardness value is as high as 90 Shore A or more the advantageous effects appear strongly. At its optimum, said hardness is from 91 to 94 shore A, most preferably 92 shore A. Generally, this narrow subrange provides good results with regard to maintainability of the bandwidth of the friction factor stable yet good capacity to achieve traction can still be easily obtained and the negative effects of the relatively hard material are still moderate and possible to eliminate with the acute angle. Other negative effects start to gradually appear when the hardness becomes very high, such as an excessively large turning radius and sensitivity to cracking. Due to this, it is in general preferable that said hardness is less than 100 shore A.

As for the acute angle alfa, it is preferable that the angle is substantially less than 90 degrees, such as less than 80 degrees. The sharper the angle alfa is, the better it can eliminate challenges induced by hard surface material. The increase in groove factor starts to show first with low gradient, and increases strongly when said acute angle is in the range below 60 degrees. The harder the surface material is, the sharper the angle alfa should be when aiming to optimum. Accordingly, with high shore A hardness values, and particularly when said hardness value is as high as 90 Shore A or more, it is preferable that said acute angle is less than 60 degrees. The optimal range of said acute angle is noticed to be with high shore A hardness values, and particularly when said hardness value is as high as 90 Shore A or more, more than 30 degrees but less than 60 degrees.

Other negative effects start to gradually appear when the angle alfa is very small. The friction and surface pressure on the rope are likely to become excessively high and lead to problems relating to strength of the rope surface and general frictional interaction between the elevator rope and the rope wheel. For this reason, it is generally preferable that said acute angle is more than 30 degrees.

Generally, best results with regard to maintainability of the bandwidth of the friction factor stable yet maintaining good capacity to achieve traction were obtained with said high hardness being from 91 to 94 shore A and the angle alfa being less than 60 degrees.

The structure of the rope 1,1', in general, is preferably such that the cross section of the rope 1,1' continues the same in its longitudinal direction 1 at least to the amount that the ribs 2 and the grooves 3 are continuous. Thereby, they extend continuously the whole length of the rope 1,1'. Thereby, they can serve their purpose, e.g. produce lateral guidance for the rope and/or increase frictional contact area between the rope and the rope wheel, throughout the length of the rope 1,1', fitting and interacting with the counterpart shape of the rope wheel without difficulties.

Figure 4A:
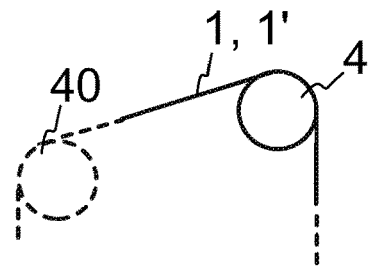
FIG. 4a illustrates a first embodiment of an elevator arrangement implementing rope of FIG. 1 or FIG. 2.
Figure 4B:
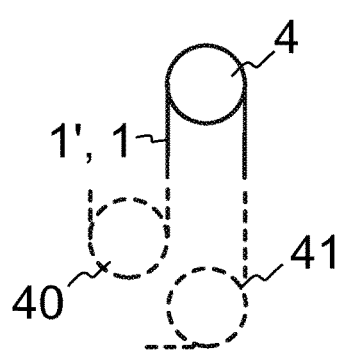
FIG. 4b illustrates a second embodiment of an elevator arrangement implementing rope of FIG. 1 or FIG. 2.

The rope 1,1' can be implemented in various different elevator arrangements. FIGS. 4a4a and 4b4b illustrate each an elevator arrangement comprising and implementing a belt-shaped rope 1,1', which is as described with reference to FIG. 1 or 2, and at least one rope wheel 4 provided with counterpart shape for the rope 1,1', in particular for a lateral side S1,S2 thereof that is shaped to have elongated wedge-shaped ribs 2 as described above. The belt-shaped rope 1,1' is arranged to pass around said at least one rope wheel 4 such that a lateral side of the rope shaped to have elongated wedge-shaped ribs engages the counterpart shape of the rope wheel 4. The rope wheel 4 can be a freely rotating rope wheel or a drive wheel rotatable with a motor. FIGS. 4a and 4b illustrate also further rope wheels 40,41, each of which can correspondingly be provided with counterpart shape for the rope 1,1'.

Figure 5:
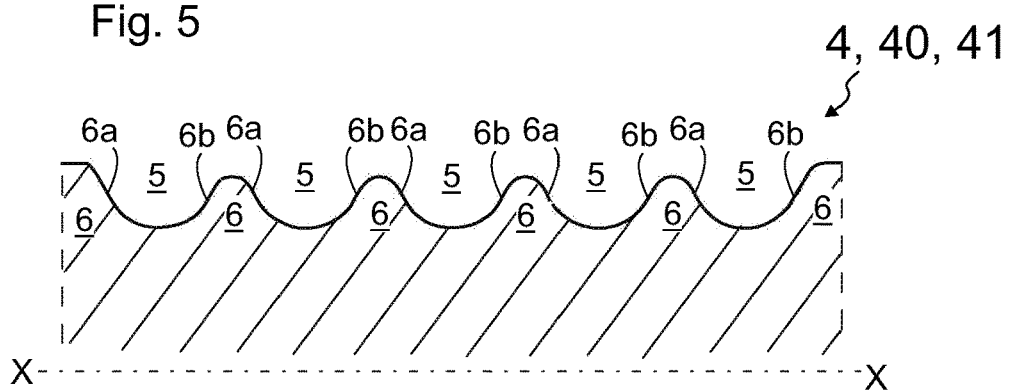
FIG. 5 illustrates a preferred cross-sectional view of a rope wheel of the elevator arrangement.

FIG. 5 illustrates preferred details of the aforementioned rope wheel 4,40,41. The rope wheel 4,40,41 is more specifically such that it comprises elongated wedge-shaped grooves 5 that are disposed adjacent each other in axial direction x of the rope wheel 4,40,41, i.e. in direction of the rotational axis thereof, and extend along the circumference of the rope wheel 4,40,41 parallel with each other.

Figure 7:
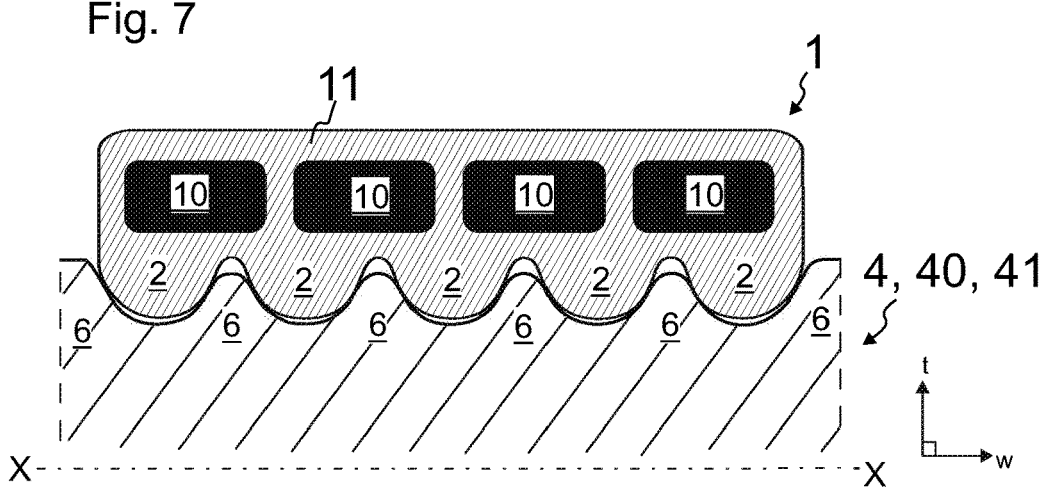
FIG. 7 illustrates the rope of FIG. 1 and a rope wheel of FIG. 5 engaging each other.
Figure 8:
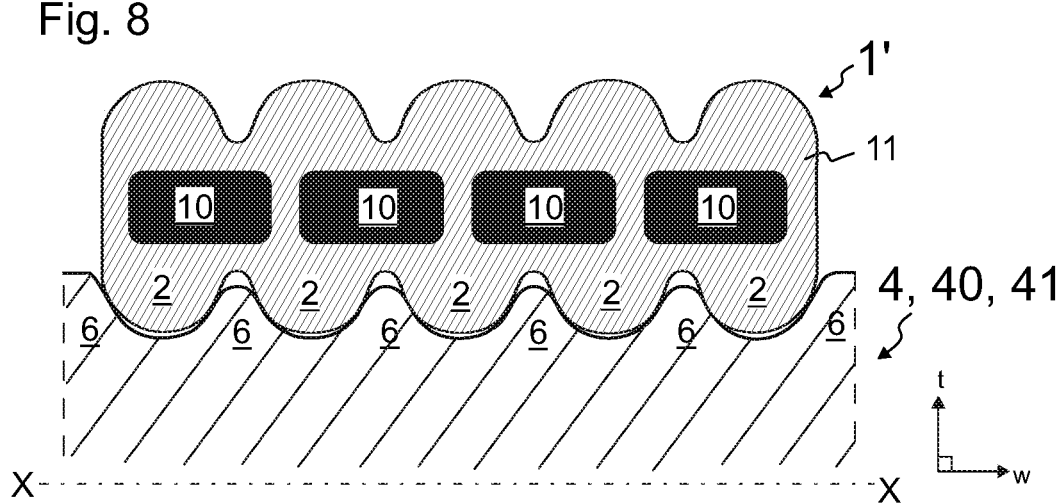
FIG. 8 illustrates the rope of FIG. 2 and the rope wheel of FIG. 5 engaging each other.

FIG. 7 illustrates the rope 1 of FIG. 1 and a rope wheel 4,40,41 of FIG. 5 engaging each other. FIG. 8 illustrates the rope 1' of FIG. 2 and the rope wheel 4,40 of FIG. 5 engaging each other. As illustrated in FIGS. 7 and 8, the ribs 2 of the rope 1 extend into grooves 5 of the rope wheel 4,40,41. The rope wheel 4,40,41 comprises elongated wedge-shaped ribs 6 that are disposed adjacent each other in axial direction x of the rope wheel 4 and extend along the circumference of the rope wheel 4,40,41 parallel with each other, each said groove 5 being delimited by flank faces 6a, 6b of neighboring ribs 6.

Each said groove 5 is delimited by flank faces 6a, 6b of neighboring wedge-shaped ribs 6. It is preferable, that each said flank face 6a, 6b of neighboring wedge-shaped ribs 6 being shaped to have an arcuate cross-sectional profile (as viewed in longitudinal direction of the rope), and each of said flank faces 6a, 6b of neighboring wedge-shaped ribs 6 are shaped to arc to such steepness that the angle alfa defined between their tangents Ta', Tb' is acute. Accordingly, flank faces of both the rope and the rope wheel reach a high steepness.

Figure 6:
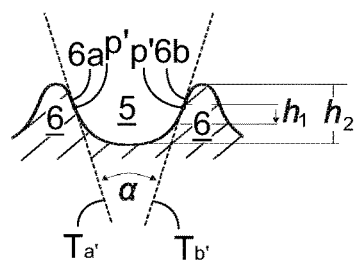
FIG. 6 illustrates an enlarged view of a groove and ribs of FIG. 5.

It is preferable, correspondingly as above explained for the rope structure, the point of tangency p' of each said tangent Ta', Tb' is within the central third h1 of the height h2 of the rib 6 as measured in radial direction of the rope wheel 4,40,41, i.e. in thickness direction t of the rope 1,1' passing around it. That is, the tangents Ta, Tb are drawn at a point of the flank face 6a,6b, which is within the central third h1 of the height h2 of the rib 6 as measured in radial direction of the rope wheel 4,40,41. This is illustrated in FIG. 6. The height of the rib 6 as measured in radial direction of the rope wheel 4,40,41 equals the distance between the rib tip and an adjacent groove bottom. In the preferred embodiment, the point of tangency of each said tangent Ta', Tb' is on the same plane extending in width direction of the rope, which is preferable in order to obtain symmetry and thereby ability to avoid distortion when being subjected to compression when tensioned around a rope wheel. It is also preferable, that the arcuate cross-sectional profiles of the flank faces 2a, 2b have a shape of an S-curve. S-curve provides smooth outline wherein amount of point loading produced on the rope does not become excessive.

In FIGS. 5-8, the above mentioned features are visible as the outlines of the flank faces 6a,6b have a first section turning in one direction and a second section turning in the other direction, the turning direction changing between said sections. Said first section turns towards the tip of the rib and said second section turns towards the bottom of the groove. In the presented case, the first section turning towards the tip of the rib has radius substantially smaller than the radius of the second section turning towards the bottom of the groove. This is preferable, as it provides that the grooves 5 have substantially larger cross sectional area than the ribs 6. Then the grooves 5 can receive large ribs of the rope having narrow grooves. For this end, it is also preferable that the radius of the bottom of the groove 5 is substantially larger than the radius of the tip of the rib 6.

In the preferred embodiments illustrated in FIGS. 7 and 8, tips of the ribs 6 of the rope wheel 4,40,41 are shaped such that an air gap is formed between the tips and the bottom of the groove 3 of the belt-shaped rope 1,1' when the belt-shaped rope 1,1' and the rope wheel 4,40,41 are engaged. The air gap provides that the splitting forces and the deformation at the groove bottom structures are evened out within a bigger material amount and sensitivity to cracks is decreased, which is advantageous particularly due to the hardness being relatively high, and the ability of the material to yield and even out internal tension thereby being more limited. The air gap provides that the rib 2 is received deeply in the groove 5 of the rope wheel. The gaps can receive dirt such that the dirt does not wedge between the narrow groove bottom and the tip of the rib 6. The height of said air gap between the tips of the ribs 6 and the bottom of the groove 3 of the belt-shaped rope 1,1' is at least 0.2 mm or more, as measured in thickness direction of the belt-shaped rope 1,1'.

FIGS. 1 and 2 also illustrate preferred details for the internal structure of the rope 1,1'. The rope 1,1' is preferably such that it comprises one or more load bearing members 10, and a coating 11 made of said surface material and forming the surface of the rope 1,1', and the one or more load bearing members 10 are embedded in the coating 11 and extend unbroken throughout the length of the rope 1,1' embedded in the coating 11. In this way, the optimal and accurate hardness of the surface material can be simply obtained without compromises with the load bearing function. If there are plurality of the load bearing members 10, they are preferably adjacent each other in width direction w of the rope 1,1', as illustrated. As mentioned, said surface material preferably comprises polymer, preferably more than 80% of it being of polymer (weight proportion). Accordingly, the coating 11 comprises polymer correspondingly.

Preferred details of the load bearing member(s) 10 of the rope 1,1' are further described hereinafter referring to FIGS. 9 and 10. The rope 1,1' being belt-shaped provides that it is turned around the rope wheels of the elevator around an axis extending in width direction w of the rope 1,1'. The width/thickness ratio of the rope 1,1' is preferably at least 2 more preferably at least 4, or even more. In this way a large cross-sectional area for the rope 1,1' is achieved, while the bending capacity around the width-directional axis is still feasible also with rigid materials of the load bearing member(s) 10, such as composite materials described later. Thereby, the rope 1,1' suits very well to be used in hoisting appliances, in particular in elevators, wherein the rope 1,1' needs to be guided to pass around one or more rope wheels with high speed. Also, it is preferable that the load bearing members 10 are wide. Accordingly, each of said one or more load bearing members 10 is preferably larger in width direction w of the rope than in thickness direction t of the rope 1,1'. Particularly, the width/thickness ratio of each of said one or more load bearing members is preferably more than 2. Thereby, the bending resistance of the rope 1,1' is small but the load bearing total cross sectional area is vast with minimal non-bearing areas.

Figure 9:
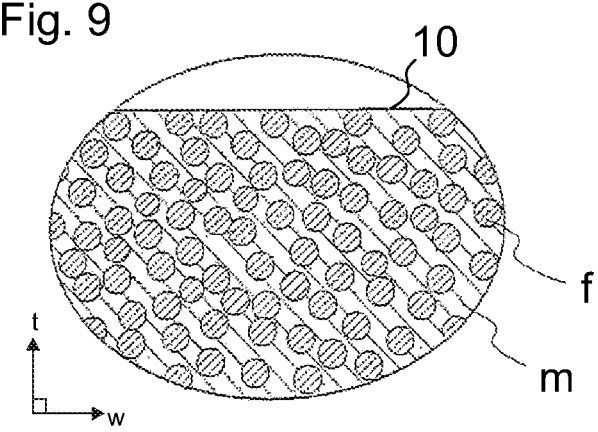
FIGS. 9 and 10 illustrate preferred details of a load bearing member of the rope.
Figure 10:
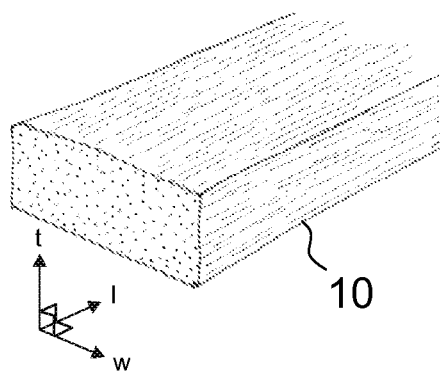

FIG. 9 illustrates a preferred inner structure for said load bearing member 10, showing inside the circle an enlarged view of the cross section of the load bearing member 10 close to the surface thereof, as viewed in the longitudinal direction l of the load bearing member 10. The parts of the load bearing member 10 not showed in FIG. 9 have a similar structure. FIG. 10 illustrates the load bearing member 10 three dimensionally. The load bearing member 10 is made of composite material comprising reinforcing fibers f embedded in polymer matrix m. The reinforcing fibers f being in the polymer matrix means here that the individual reinforcing fibers f are bound to each other with a polymer matrix m. This has been done e.g. in the manufacturing phase by immersing them together in the fluid material of the polymer matrix which is thereafter solidified. The reinforcing fibers f are distributed substantially evenly in polymer matrix m and bound to each other by the polymer matrix m. The load bearing member 10 formed is a solid elongated rod-like one-piece structure. Said reinforcing fibers f are most preferably carbon fibers, but alternatively they can be glass fibers, or possibly some other fibers. Preferably, substantially all the reinforcing fibers f of each load bearing member 10 are parallel with the longitudinal direction of the load bearing member 10. Thereby, the fibers f are also parallel with the longitudinal direction of the rope 1,1' as each load bearing member 10 are to be oriented parallel with the longitudinal direction of the rope 1,1'. This is advantageous for the rigidity as well as behavior in bending. Owing to the parallel structure, the fibers in the rope 1,1' will be aligned with the force when the rope 1,1' is pulled, which ensures that the structure provides high tensile stiffness. The fibers f used in the preferred embodiments are accordingly substantially untwisted in relation to each other, which provides them said orientation parallel with the longitudinal direction of the rope 1,1'. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 10, preferably continuing for the whole length of the load bearing member 10.

As mentioned, the reinforcing fibers f are preferably distributed in the polymer matrix of the load bearing member 10 substantially evenly. The fibers f are then arranged so that the load bearing member 10 would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of force exerted on the fibers, reduces fiber-fiber contacts and internal wear of the rope, thus improving the service life of the rope 1,1'. Owing to the even distribution, the fiber density in the cross-section of the load bearing member 10 is substantially constant. The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but also any other suitable alternative materials can be used.

The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

The reinforcing fibers f together with the matrix m form a uniform load bearing member, inside which no substantial abrasive relative movement occurs when the rope is bent. The individual reinforcing fibers f of the load bearing member 10 are mainly surrounded with polymer matrix m, but random fiber-fiber contacts can occur because controlling the position of the fibers in relation to each other in their simultaneous impregnation with polymer is difficult, and on the other hand, elimination of random fiber-fiber contacts is not necessary from the viewpoint of the functioning of the solution. If, however, it is desired to reduce their random occurrence, the individual reinforcing fibers f can be pre-coated with material of the matrix m such that a coating of polymer material of said matrix is around each of them already before they are brought and bound together with the matrix material, e.g. before they are immersed in the fluid matrix material.

As above mentioned, the matrix m of the load bearing member 10 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the load bearing member 10, among other things, it is therefore preferred that the polymer matrix m is hard, and in particular non-elastomeric. The most preferred materials for the matrix are epoxy resin, polyester, phenolic plastic or vinyl ester. The polymer matrix m is preferably such that its module of elasticity (E) is over 2 GPa, more preferably over 2.5 GPa, and less than 10 GPa. Most preferably the module of elasticity E is in the range 2.5-4.5 GPa. There are commercially available various material alternatives for the matrix m which can provide these material properties and means to adjust the values to be as desired. Preferably over 50% proportion of the surface area of the cross-section of the load bearing member 10 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 10 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing member 10 is preferably completely nonmetallic, i.e. made not to comprise metal.

Rigidity of the matrix m and/or orientation of the fibers f parallel with the longitudinal direction of the rope 1,1' and/or the particular fiber selection (carbon) all have an increasing effect on the rigidity of the load bearing member 10 against bending. Owing to high rigidity resulting from the composite material, harder surface material than in prior solutions, is well compatible with it. The rope 1,1', when it is rigid, particularly due to being made of composite material containing one or more of said features prone to increase rigidity against bending, is to be guided with rope wheels 4 of relatively large radius. Large radius benefits both the load bearing members 10 and the surface material as the hard surface material is prone to being sensitive to problems caused by surface material rigidity against bending. Accordingly, rigid load bearing members 10 are particularly advantageous in combination with the surface material having hardness 90 shore A or more. The diameter of the rope wheel 4 with composite material and hard surface material of the rope 1,1' is preferably more than 250 mm.

The rope 1,1' is furthermore preferably such that the aforementioned load bearing member 10 or a plurality of load bearing members 10, comprised in the rope 1,1', together cover majority, preferably 70% or over, more preferably 75% or over, most preferably 80% or over, most preferably 85% or over, of the width of the cross-section of the rope 1,1' for essentially the whole length of the rope 1,1'. Thus, the supporting capacity of the rope 1,1' with respect to its total lateral dimensions is good, and the rope 1,1' does not need to be formed to be thick.

Figure 11:
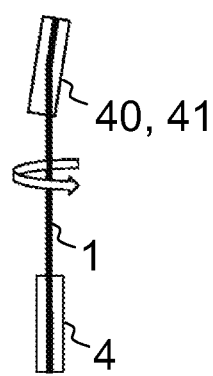
FIG. 11 illustrates a pulley arrangement where rope twist is present.

FIG. 11 illustrates the elevator arrangement where fleet angle and rope twist exist in the rope configuration. As mentioned, the combination of hard surface material and sharp flank angle facilitate stability of this kind of rope system by reducing random occurrence of climbing of the rope 1,1' along either of the flank faces of the groove of the rope wheel 4,40,41 wherein the rope is fitted during use. Relatively low friction coefficient resulting from the hard material and the sharp angle together reduce ability and likelihood of the rope to climb along the flank face and such that it can escapes the groove of the rope wheel 4,40,41. As a result, the behavior of the rope 1,1' is more stable as the system becomes more tolerant of twist or fleet angle existing in the system intentionally or unintentionally.

Figure 12:
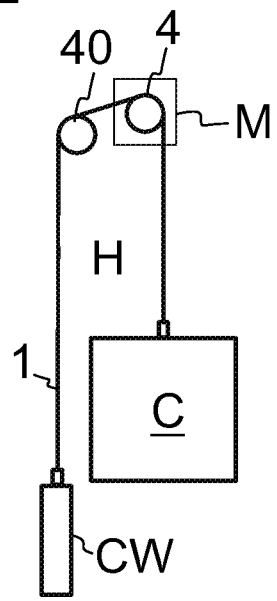
FIG. 12 illustrates a first embodiment of an elevator implementing a rope and an elevator arrangement.

FIG. 12 illustrates an elevator comprising an elevator arrangement as described above referring to FIGS. 1, 4*a* and 7. The elevator comprises an elevator car C and a counterweight CW that are both vertically movable in a hoistway H, and said rope 1 is connected with the elevator car C and the counterweight CW. In this elevator there are ribs 2 present on only one side of the rope 1, because only one side of the rope 1 comes in contact with the rope wheels 4,40 of the elevator when running along its route. The elevator comprises an elevator arrangement comprising a belt-shaped rope 1 as illustrated in FIG. 1, and one or more rope wheels 4,40 (in this case two) provided with counterpart shape for the rope 1, in particular for a lateral side S1 thereof that is shaped to have elongated wedge-shaped ribs 2. The belt-shaped rope 1 is arranged to pass around rope wheels 4,40 such that a lateral side S1 of the rope 1 shaped to have elongated wedge-shaped ribs 2 engages the counterpart shape of each rope wheel 4,40. In the presented case, the elevator comprises a motor M and said rope wheels 4,40 comprise a drive wheel 4 rotatable with the motor M. The advantages related to the friction and groove factor are particularly important when the rope 1 is to be moved by rotation of the drive wheel 4, because the traction of the driven wheel is dependent on the friction and groove factor, and in general on all interaction between the drive rope wheel 4 and the rope 1. The rope wheels 4,40 are in the presented case mounted in proximity of the upper end of the hoistway H. The drive wheel 4 and the motor M can be mounted inside the upper end of the hoistway H whereby the elevator is machine-roomless, but alternatively they can be mounted inside a space beside or above the upper end of the hoistway H, for example, wherein said space can form a machine room of the elevator, for instance.

Figure 13:
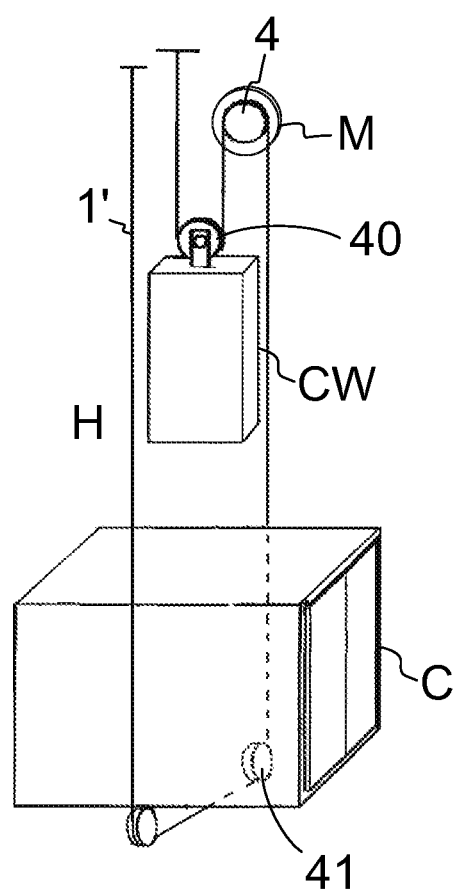
FIG. 13 illustrates a second embodiment of an elevator implementing a rope and an elevator arrangement.

FIG. 13 illustrates an elevator comprising an elevator arrangement as described above referring to FIGS. 2, 4*b* and 7. The elevator comprises an elevator car C and a counterweight CW that are both vertically movable in a hoistway H, and said at least one rope 1' is connected with the elevator car C and the counterweight CW.

The elevator comprises rope wheels 4,40,41 provided with a counterpart shape for a lateral side S1,S2 of the rope 1' that is shaped to have elongated wedge-shaped ribs 2. The belt-shaped rope 1' is arranged to pass around rope wheels 4,40,41 such that a lateral side S1, S2 of the rope 1' shaped to have elongated wedge-shaped ribs 2 engages the counterpart shape of the rope wheel 4,40,41.

The elevator presented in FIG. 13 is particularly of the type where the rope wheel 4,40,41 comprises two rope wheels 4,41, which have mutually nonparallel rotational axes, whereby the rope 1,1' passing between these two rope wheels 4,41 has twist around its longitudinal axis. As visible in FIG. 13, one of these rope wheels is the drive wheel 4 mounted on a stationary structure (such as on the building or a structure mounted thereon e.g. a guide rail), and the other is a rope wheel mounted on the car C. Said two rope wheels 4,41 are each provided with a counterpart shape for the rope 1,1', and the belt-shaped rope 1,1' is arranged to pass around each of said two rope wheels 4,41 such that a lateral side S1, S2 thereof that is shaped to have elongated wedge-shaped ribs 2, engages the counterpart shape of the rope wheel 4,41 in question. The mutually nonparallel rotational axes are at a considerably large angle, the angle being in particular in the range 30-90 degrees, whereby the elevator is designed to have intentionally considerable twist in the belt-shaped rope. Ability to guide the ropes without problems with a large angle between the rotational axes, gives freedom to layout design. In the presented case, said range provides that the rope can turn around a rope wheel 4 along a plane extending beside the car C, and still pass to car C and be diverted to pass via the central area of the vertical projection of the car C. This provides that the suspension is made more central. Combination of hard surface material and sharp flank angle facilitate stability of rope system having rope twist as above described referring to FIG. 11.

The belt-shaped rope 1' of the elevator is as illustrated in FIG. 2. Accordingly, the opposite lateral sides S1, S2 of the belt-shaped rope 1' are both shaped to have elongated wedge-shaped ribs 2 that are disposed adjacent each other in width direction w of the rope 1' and extend parallel with the longitudinal direction 1 of the rope 1', each said wedge-shaped rib 2 having a first flank face 2a and a second flank face 2b that are at an acute angle alfa relative to each other, and the surface material of said flank faces 2a, 2b has shore A hardness more than 85 and less than 100. Accordingly, in this elevator there are ribs 2 on two opposite sides S1,S2 of the rope 1'. This is advantageous, because in this elevator two opposite sides of the rope 1' come in contact with the rope wheels 4,40 of the elevator when running along its route. As visible in FIG. 13, the elevator comprises two rope wheels 4,40, which are provided with a counterpart shape for the rope 1,1', and said the belt-shaped rope 1,1' is arranged to pass around said two rope wheels 4,40 such that one its lateral sides S1, S2 shaped to have elongated wedge-shaped ribs 2 engages the counterpart shape of one of the rope wheels 4,40, and the other of its lateral sides S1, S2 shaped to have elongated wedge-shaped ribs 2 engages the counterpart shape of the other of the rope wheels 4,40.

In the elevator of FIG. 13, the elevator comprises a motor M and said rope wheels 4,40,41 comprise a drive wheel 4 rotatable with the motor M. The rope wheel 4 is in the presented case mounted inside the upper end of the hoistway H, which is advantageous as hereby the elevator is machine-roomless. As mentioned, the belt-shaped rope 1' of the elevator is in this preferred embodiment as illustrated in FIG. 2, because this is advantageous for the reverse-bending configuration realized between rope wheels 4 and 40. However, alternatively also this elevator could be implemented using the rope 1 of FIG. 1. The advantages related to twist taking place between rope wheels 4 and 41 can be obtained irrespective of whether the rope is in accordance with FIG. 1 or 2. This is because the side of the rope 1' to be placed against the rim of rope wheel 41 is preferably the same that is placed against the rim of the rope wheel 4.

The elevators of FIGS. 12 and 13 preferably further comprises a control unit (not showed) for automatically controlling rotation of the motor M, whereby the movement of the car C is also made automatically controllable. In elevators of FIGS. 12 and 13, the rope 1,1' is a suspension rope 1,1' arranged to suspend the elevator car C, and belongs to a suspension roping comprising one or more suspending ropes for suspending the elevator car C.

The rope wheel 4 comprises elongated wedge-shaped grooves 5 that are disposed adjacent each other in axial direction x of the rope wheel 4 and extend along the circumference of the rope wheel 4 parallel with each other, and the ribs 2 of the rope 1 extend into grooves 5 of the rope wheel 4. Each said groove 5 is delimited by flank faces 6a, 6b of neighboring ribs 6 that have an arcuate cross-sectional profile.

In the preferred embodiments, an advantageous structure for the load bearing member 10 and the rope 1 has been disclosed. However, the invention can be utilized with also other kind of the load bearing members and rope constructions such as with those of different materials and/or shapes. The load bearing member(s) 10 are most preferably made of composite material as described. However, they can in principle be made of alternative materials, such as in the form of twisted steel wire cords or twisted aramid fiber cords.

The number of ribs 2 of the at least one of the lateral sides is preferably five or more. Hereby, firm engagement can be ensured and size of the grooves and ribs maintained small. However, the number can of course also be designed smaller, such as 2, 3, or 4.

In the illustrated embodiments, the load bearing members 10 are substantially rectangular and larger in width direction than thickness direction. However, this is not necessary as alternative shapes could be used. Likewise, it is not necessary that the number of the load bearing members is four which is used for the purpose of the example. The rope 1 may of course be modified to have some other number of said load bearing members 1, such as 1, 2, 3, 5 or six or more.

In FIGS. 12 and 13, the suspension ratios 1:1 and 2:1 have been illustrated. The rope 1,1' could alternatively be implemented in any other kind of elevator, such as an elevator of 4:1 suspension ratio.

As mentioned, the rope 1,1' is preferably a suspension rope. However, each rope 1,1' can alternatively be used as a compensation rope or an overspeed governor rope or an elevator.

As mentioned, it is preferable that the shape of grooves and ribs of the rope wheel is exactly the same as the shape of grooves and ribs of the rope. However, this is not absolutely necessary as it is possible to gain one or more of the advantages at least partially even though the shapes do not match completely. This is true for example when the mating faces only slightly differ in angle or shape.

As mentioned, each said rope wheels 4,40,41 is provided with counterpart shape for the rope 1,1'. This means that the rope wheel 4,40,41 comprises elongated wedge-shaped grooves 5 that are disposed adjacent each other in axial direction x of the rope wheel 4,40,41 and extend along the circumference of the rope wheel 4,40,41 parallel with each other and the ribs 2 of the rope 1,1' are suitable for extending into grooves of the rope wheel. The grooves 3 of the rope 1,1', on the other hand, are likewise suitable for receiving ribs of said rope wheel. The flank faces 6a, 6b of the rope wheel 4,40,41 have been shaped at least substantially similar, but negative, in respect to the flank faces 2a, 2b of the ribs 2 of the rope 1,1', whereby these fit well each other. However, exactly similar negative shape is not necessary as some elastic deformation in the rope surface is acceptable and enabled by the surface material of the rope 1,1'.

In the embodiment of FIG. 2, there are the same number of ribs on sides S1,S2. However, this is not necessary as alternatively there can be different number of ribs on said sides S1,S2.

In the examples, each rope wheel 4,40,41 is suitable for engagement with at least one rope 1,1'. The vertical lines on left and right in FIGS. 5 and 7-8 have been drawn dashed to indicate that the ribbed shape of the rope wheel 4,40,41 could continue left and/or right such that several ropes 1,1' can be engaged with the one and same rope wheel 4,40,41.

As mentioned earlier, the hardness properties of the surface material can be adjusted to the desired values with additives or particles added to the polymer serving as base material. Optionally, particles can also be provided in the surface material in order to roughen the surface of the rope 1,1' which may be advantageous for adjusting the friction properties further.

Generally, it is preferable that the tips of the ribs of the rope are arcuate, i.e. the tips of the ribs of the rope have no straight section extending in width direction of the rope. This is visible in the embodiments presented in the Figures.

As for the more specific details of the preferred shape of the wedge-shaped ribs 2, there are different alternatives. As one option, the ribs 2 can have a circular cross section as viewed in longitudinal direction of the rope 1,1', i.e. the flank faces 2a,2b each form part of a concentric circular arch. In this case, the rope 1,1' and rope wheel 4,40,41 can be designed relative to each other such that the grooves 5 of the rope wheel 4,40,41 have also a circular cross section, wherein the flank faces 6a,6b delimiting each groove 5 form each part of a concentric circular arch, as visible in the embodiments presented in the Figures. The radius of the circular cross section of the rib 2 can be equal to the radius of the circular cross section of the groove 5. Thereby, the flank faces 6a, 6b of the rope wheel 4,40,41 can be shaped similar, but negative, in respect to the flank faces 2a, 2b of the ribs 2 of the rope 1,1'. However, alternatively, the radius of the circular cross section of the rib 2 is larger than the radius of the circular cross section of the groove 5. This is visible in the embodiments presented in the Figures. It is however, not necessary that the shapes are circular. As an alternative, the ribs 2 can have a parabolique cross section as viewed in longitudinal direction of the rope 1,1', i.e. the flank faces define flanks of the parabola. In this case, the grooves 5 of the rope wheel 4,40,41 preferably have a parabolique cross section as well, but negative so that the rib 2 fits into the groove 5.

Generally, each said first and second flank face can comprise a convex portion and/or a concave portion.

The aforementioned rope wheels 4,40,41 can be metallic or non-metallic. The flank faces 6a, 6b of the rope wheels 4,40,41 can be smooth or there can be transversal grooves (depth>0.2 mm) on the flank faces 6a, 6b to collect dirt that enables good friction if the rope wheel 4,40,41 collect dust, particles, etc. Due to the grooves to collect dirt the contact remains although the rope wheel gets dirty since the dirt accumulates on the bottom of the grooves.

The hardness values defined in this application refer to values as measured in standard atmospheric conditions with temperature 20° C. and pressure 1 atm (101.325 kPa).

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A belt-shaped rope of an elevator, the belt-shaped rope comprising:
   one or more load bearing members extending parallel with a longitudinal direction of the rope; and
   a coating forming a surface of the rope with the one or more load bearing members embedded therein with at least one lateral side of the rope being shaped to have elongated ribs that are disposed adjacent to each other in width direction of the rope and extend parallel with the longitudinal direction of the rope such that a height of the ribs extend in a thickness direction of the rope perpendicular to the width direction of the rope, each said rib on a same one of the at least one lateral side having a pair of flank faces including a first flank face for contacting a first flank face of a rib of a rope wheel, a second flank face for contacting a second flank face of the rib of the rope wheel, wherein
   the pair of flank faces are each shaped so that an entirety of each of the pair of flank faces has an arcuate cross-sectional profile with tangent lines extending from points of tangency on respective ones of the pair of flank faces located within a central third of the height of the rib in the thickness direction of the rope such that the tangent lines of the pair of flank faces form an acute angle therebetween with, at least at the points of tangency, an internal structure of the ribs from the first flank face to the second flank face in the width direction of the rope being formed entirely from a material of the coating of the rope, and
   the material of the coating has shore A hardness more than 85 and less than 100.

2. The belt-shaped rope according to claim 1, wherein the arcuate cross-sectional profiles of the flank faces have a shape of an S-curve.

3. The belt-shaped rope according to claim 1, wherein the material of the coating has a shore A hardness of 90 or more.

4. The belt-shaped rope according to claim 1, wherein the material of the coating has a shore A hardness from 91 to 94.

5. The belt-shaped rope according to claim 1, wherein the acute angle between the tangent lines of the pair of flank faces is less than 60 degrees.

6. The belt-shaped rope according to claim 1, wherein
   the acute angle between the tangent lines of the pair of flank faces is less than 60 degrees, and
   the material of the coating has a shore A hardness from 91 to 94.

7. The belt-shaped rope according to claim 1, wherein the material of the coating comprises polymer.

8. The belt-shaped rope according to claim 1, wherein said at least one lateral side is shaped to have one or more elongated grooves, each of the one more elongated grooves extending between neighboring ones of the ribs parallel with the longitudinal direction of the rope and each of the one more elongated grooves is delimited by the first flank face of a first one of the neighboring ones of the ribs and the second flank face of a second one of the neighboring ones of the ribs.

9. The belt-shaped rope according to claim 1, wherein the one or more load bearing members are embedded in the coating and extend parallel with the longitudinal direction of the rope unbroken throughout a length of the rope.

10. The belt-shaped rope according to claim 1, wherein the one or more load bearing members are made of composite material comprising reinforcing fiber embedded in a polymer matrix, the reinforcing fibers being carbon fibers or glass fibers.

11. The belt-shaped rope according to claim 1, wherein the at least one lateral side of the rope shaped to have the elongated ribs includes two lateral sides of the rope spaced apart in the thickness direction of the rope, the ribs of each of the two lateral sides of the rope each having the pair of flank faces.

12. An elevator arrangement comprising:
   the least one belt-shaped rope of an elevator according to claim 1, and the rope wheel wherein
   the at least one belt-shaped rope is configured to pass around the rope wheel such that the first flank face of the rope contacts the first flank face of the rib of the rope wheel and the second flank face of the rope contacts the second flank face of the rib of the rope wheel.

13. The elevator arrangement according to claim 12, wherein the rope wheel comprises elongated grooves that are disposed adjacent each other in axial direction of the rope wheel and extend along a circumference of the rope wheel parallel with each other, and the ribs of the rope extend into grooves of the rope wheel.

14. The elevator arrangement according to claim 12, further comprising:
   another rope wheel having a first flank face and a second flank face, wherein
      the at least one belt-shaped rope is configured to pass around the another rope wheel such that the first flank face of the rope contacts the first flank face of the rib of the another rope wheel and the second flank face of the rope contacts the second flank face of the rib of the another rope wheel.

15. The elevator arrangement according to claim 14, wherein the rope wheel and the another rope wheel have mutually nonparallel horizontal rotational axes.

16. The elevator arrangement according to claim 14, wherein
   the at least one lateral side of the rope shaped to have the elongated ribs includes two lateral sides of the rope spaced apart in the thickness direction of the rope, the ribs of each of the two lateral sides of the rope each having the pair of flank faces, and
   the at least one belt-shaped rope is configured to pass around the rope wheel and the another rope wheel such that the elongated ribs of a first one of the two lateral sides is shaped to engage the rope wheel, and the elongated ribs of a first one of the two lateral sides is shaped to engage of the another rope wheel.

17. The elevator arrangement according to claim 12, further comprising:
   an elevator car connected to the least one belt-shaped.

* * * * *